US012564744B1

(12) United States Patent
Abeles

(10) Patent No.: US 12,564,744 B1
(45) Date of Patent: Mar. 3, 2026

(54) APPARATUS AND METHOD FOR MITIGATING SANTA ANA WIND FIRE HAZARDS

(71) Applicant: VIRIDIS ARBOR LLC, Verona, NJ (US)

(72) Inventor: Gary E. Abeles, Verona, NJ (US)

(73) Assignee: VIRIDIS ARBOR LLC, Verona, NJ (US)

( * ) Notice: Subject to any disclaimer, the term of this patent is extended or adjusted under 35 U.S.C. 154(b) by 0 days.

(21) Appl. No.: 19/052,350

(22) Filed: Feb. 13, 2025

(51) Int. Cl.
*A62C 3/02* (2006.01)
*A62C 2/08* (2006.01)
*A62C 31/28* (2006.01)
*A62C 99/00* (2010.01)

(52) U.S. Cl.
CPC .............. *A62C 3/0264* (2013.01); *A62C 2/08* (2013.01); *A62C 31/28* (2013.01); *A62C 99/0009* (2013.01)

(58) Field of Classification Search
CPC ......... A62C 3/0264; A62C 2/08; A62C 31/28; A62C 99/0009
USPC ........................................................... 169/13
See application file for complete search history.

(56) References Cited

U.S. PATENT DOCUMENTS 2,891,624 A * 6/1959 McBride .............. A62C 3/0207 169/44
5,154,235 A * 10/1992 Renaker, Jr. ......... A62D 1/0014 428/920
6,057,606 A * 5/2000 Porat ...................... A01G 15/00 290/55
6,695,068 B2 * 2/2004 Woodall .................. B63B 21/56 169/48
10,718,095 B2 * 7/2020 Abeles ...................... E02B 3/06
11,277,962 B2 * 3/2022 Abeles ................... A01C 1/044
2006/0213672 A1 * 9/2006 Mohr ..................... A62C 27/00 169/46
2006/0289176 A1 * 12/2006 Butler .................... A62C 31/24 169/54
2012/0067600 A1 * 3/2012 Bourakov ............ A62C 3/0257 169/49
2013/0307270 A1 * 11/2013 Steen ...................... F03D 80/00 290/55
2019/0262637 A1 * 8/2019 Statter .................. A62C 3/0271
2022/0379149 A1 * 12/2022 Nordlund ........... A62C 99/0072

* cited by examiner

*Primary Examiner* — Arthur O. Hall
*Assistant Examiner* — Kevin Edward Schwartz
(74) *Attorney, Agent, or Firm* — Maine Cernota & Curran

(57) ABSTRACT

A fire hazard due to Santa Ana winds is mitigated by causing the winds to flow through an evaporative barrier proximate an entrance to a canyon, thereby cooling, humidifying, and slowing the winds. Water applied to the barrier can be drawn by a pump from an underlying aquifer. Power for the pump can be provided by a windmill positioned in the path of the winds, and/or by solar panels. A mat containing seeds and/or seedlings and super absorbent polymer (SAP) can be positioned upwind or downwind of the evaporative barrier, and water can be applied to the mat, causing the winds to pass through the resulting vegetation, thereby further slowing and humidifying the winds. A thermally conductive network can cool the mat by conducting heat from the mat to the evaporative barrier. Brackish water can be directed to a desalination apparatus, and thence as fresh water to the mat.

11 Claims, 6 Drawing Sheets

APPARATUS AND METHOD FOR MITIGATING SANTA ANA WIND FIRE HAZARDS

RELATED APPLICATIONS

This application is related to U.S. patent application Ser. No. 19/003,522, filed on Dec. 27, 2024, and to U.S. Pat. No. 12,213,397, 11/277,962, 10,660,264, and 9,629,341, all of which are herein incorporated by reference in their entirety for all purposes.

FIELD OF THE INVENTION

The invention relates to apparatus and methods for reducing fire risks, and more specifically to apparatus and method of mitigating fire dangers caused by winds flowing through canyons from deserts onto fire prone areas.

BACKGROUND OF THE INVENTION

The recent spate of deadly and costly fires that recently swept through communities near Los Angeles, California have drawn the attention of the world to the dangers of hot dry winds that flow from a desert through canyons onto a fire prone region.

With reference to FIG. 1, in the specific case of the greater Los Angeles area, the region 108 is separated by mountains 102 from an elevated desert 100 that is generally referred to as the "Great Basin," and the "Santa Ana" winds 106 that flow from the Great Basin 100 through canyons 104 onto Los Angeles 108 arise due to high pressure systems over the Great Basin 100, in combination with low pressure from offshore winds in the Los Angeles area 108. When these conditions arise, hot, dry winds 106 flow from the Great Basin 100 toward Los Angeles 108 through canyons 104 that greatly accelerate the velocity of the wind 106 and direct it to the city 108. While these conditions are likely not unique to Los Angeles, the Santa Ana winds are referred to herein as being exemplary, and the term "Santa Ana winds" is intended to refer generically to any winds that frequently flow from deserts through canyons to fire prone areas.

Three distinct properties of the Santa Ana winds are responsible, in combination, for the very high fire danger that results, which are the high temperatures of the winds, the extreme dryness of the winds, and the high speeds of the winds.

Efforts have been made in the Los Angeles area to reduce the fire danger by implementing fire mitigating procedures, such as clearing excess dead brush from wilderness areas, replacing wooden rooves that are covered by flammable asphalt shingles with tile rooves or other roofing options that are less susceptible to ignition by drifting embers, and ensuring that fire hydrants and the water that serves them is plentiful. Some owners of homes that include swimming pools have installed pumps and other equipment that enable them to apply water from the pools to their homes, and to neighboring homes, even when water pressure is low. However, very few options have been proposed that would somehow mitigate the heat, dryness, and/or velocity of the Santa Ana winds themselves.

What is needed, therefore, are an apparatus and method of reducing the temperature, dryness, and/or velocity of Santa Ana winds.

SUMMARY OF THE INVENTION

The present invention is an apparatus and method of reducing the temperature, dryness, and velocity of hot dry winds that flow from a desert through a canyon onto a fire prone area, where said winds are referred to herein generically as "Santa Ana" winds. While not limited only to Southern California, the present invention is sometimes described herein with reference to the winds that flow from the Great Basin through canyons into the Los Angeles area. However, it will be understood that the present invention is applicable to any region where hot dry winds flow from a desert through canyons onto an area where it is desirable to reduce fire risks.

The present invention takes advantage of the concentration of flowing desert air that occurs as the air approaches an entrance to a canyon through which it will flow as Santa Ana winds toward the fire prone area. This concentrating effect provides a relatively small region where mitigation can be implemented. Specifically, the invention comprises erecting a porous, evaporative barrier that is configured to intercept a significant fraction of the flowing air as it enters the canyon. When Santa Ana wind conditions are present, water is applied continuously to the barrier. As the air flows through the barrier, it is cooled and humidified by the resulting evaporation of water. In addition, the evaporative barrier serves as a physical barrier that disrupts the air flow, and thereby slows its velocity.

The water that is applied to the evaporative barrier can be derived from any convenient source. In the case of the Great Basin, there are few sources of surface water that can be utilized. However, there is a significant aquifer that underlies the desert, from which water can be pumped for application to the evaporative barrier. The energy that is required to operate the pump(s) can be derived from any convenient energy source. In embodiments where a conventional power source is not available, solar panels are used to provide the required energy, while in other embodiments one or more windmills are erected near the entrance to the canyon, and hence in the direct path of the flowing air. Windmills can be preferred, because, in addition to providing energy, they serve as an added physical barrier to the Santa Ana winds, and thereby further reduce the wind velocity, and also because their energy output is maximized precisely when it is most needed, which is when the Santa Ana winds are blowing. Of course, electricity derived from a plurality of sources can be combined to meet the energy needs of the present invention.

In embodiments, a barrier reservoir is provided proximate the bottom of the evaporative barrier, where water that has not been evaporated is collected, and from which the water is recirculated to the top of the barrier, thereby reducing the quantity of water that must be supplied from the underground aquifer and/or from other sources.

While some fresh water can be found in aquifers near mountain fronts in the Great Basin, much of the groundwater beneath the Great Basin is saline or brine, referred to herein as "brackish" water. In embodiments of the present invention where the water applied to the evaporative barrier is brackish, the water becomes increasingly saline as it is repeatedly circulated between the barrier reservoir and the top of the barrier. As a result, the water in the barrier reservoir must be periodically expelled and replenished. In some of these embodiments, the water that is expelled from the barrier reservoir is collected in a drying tray, where it is fully evaporated, thereby providing a source of salt that can be harvested and used commercially.

In addition to the evaporative barrier and associated apparatus, the present invention further comprises a mat assembly from which vegetation is grown. The mat assembly is also located in the path of the flowing winds, where the resulting vegetation releases additional water vapor into the atmosphere due to transpiration, thereby providing an additional source of humidity. In embodiments, the vegetation also serves as an additional physical barrier that further slows the velocity of the winds. The mat assembly includes a mat, which can be a biodegradable coir mat, which is impregnated with seeds and/or seedlings, and with a "super absorbent polymer" or "SAP." In embodiments, the SAP is biodegradable, and in some of these embodiments the SAP is a cellulose-based or starch-based polymer. In some embodiments, fertilizer is included in the mat. And in various embodiments at least one of sand and soil is included in the mat.

The mat is placed either at grade or slightly below grade, and sufficient fresh water is applied to cause the SAP to become hydrated, thereby enabling the seeds and/or seedlings to sprout and/or take root in the mat. If the available water is brackish, then some of the water is directed to reverse osmosis apparatus, and/or other desalination apparatus, from which the resulting fresh water is directed to the mat.

In various embodiments, the mat is cooperative with a "thermally conductive network" that comprises at least one mesh, web, or other network of thermally conductive fibers, such as a mesh of copper wire or a network of high crystallinity polyethylene nanofibers. The thermally conductive network extends to the evaporative barrier, and is cooled thereby, which results in cooling of the mat, and consequent cooling of the vegetation as it germinates and grows from the mat.

In some embodiments, the vegetation that grows from the mat includes large, sturdy bushes and/or trees, which provide an added physical barrier to the flow of air toward the canyon, in addition to the evaporative barrier and, in embodiments, to the one or more windmills.

A first general aspect of the present invention is a method of mitigating fire hazards arising from a wind flowing from a desert through a canyon onto a fire prone region. The method includes providing a source of water proximate an entrance to the canyon, providing a source of electrical energy proximate the entrance to the canyon, providing an evaporative cooling system, said evaporative cooling system comprising an evaporative barrier erected proximate an entrance to the canyon, the evaporative barrier being configured to expose the wind to water disbursed within the evaporative barrier, thereby cooling and humidifying the wind, and slowing a velocity of the wind, and providing a pump cooperative with the source of electrical power, the source of water, and the evaporative barrier, the pump being configured to direct water from the source of water onto the evaporative barrier.

In embodiments, the evaporative cooling system further comprises a barrier reservoir configured to collect water that drains from the evaporative barrier. In some of these embodiments, the evaporative cooling system further comprises a pumping system configured to recycle the collected water from the barrier reservoir to the evaporative barrier. In some of these embodiments, the water that is applied to the evaporative barrier is brackish, and wherein the method further comprises directing brackish water that is removed from the barrier reservoir to a drying tray, and allowing the brackish water in the drying tray to fully dry, thereby providing a residue of salt.

In any of the above embodiments, the source of water can comprise a well configured to draw water from an underlying aquifer.

In any of the above embodiments, the source of electrical energy can comprise a solar energy system.

In any of the above embodiments, the source of electrical energy can comprise at least one windmill configured to convert energy derived from the wind into electrical energy.

Any of the above embodiments can further include providing a mat having incorporated therein seeds and/or seedlings and a super-absorbent polymer ("SAP"), locating the mat at or slightly below grade, and applying fresh water to the mat, thereby causing vegetation to germinate and grow from the mat, so that the wind flows through the vegetation, whereupon the vegetation adds humidity to the wind and reduces the velocity of the wind. in some of these embodiments, the vegetation includes a plurality of trees. In any of these embodiments, locating the mat can comprise installing the mat downwind of the evaporative barrier. And in any of these embodiments wherein the water applied to the evaporative barrier is brackish, applying fresh water to the mat can comprise directing water from the source of water to a desalination apparatus, and therefrom to the mat.

A second general aspect of the present invention is an apparatus configured to mitigate fire hazards arising from a wind flowing from a desert through a canyon to a fire prone region. The apparatus includes an evaporative cooling system, said evaporative cooling system comprising an evaporative barrier erected proximate an entrance to the canyon, the evaporative barrier being configured to expose the wind to water disbursed within the evaporative barrier, thereby cooling and humidifying the wind, and slowing a velocity of the wind, a pump configured to direct water onto the evaporative barrier, at least one windmill located upwind of the evaporative barrier and configured to provide electrical energy to the pump, a mat having seeds and/or seedlings and a super-absorbent polymer ("SAP") incorporated therein, the mat being installed at or slightly below grade at a location where the wind will flow over the mat, and a fresh water application system configured to apply fresh water to the mat, thereby causing vegetation to germinate and grow from the mat, such that the wind flows through the vegetation, whereupon the vegetation adds humidity to the wind and reduces the velocity of the wind.

In embodiments, the mat includes coir.

Any of the above embodiments can further include fertilizer cooperative with the mat.

Any of the above embodiments can further include at least one of sand and soil cooperative with the mat.

Any of the above embodiments can further include a perforated, transparent or translucent cover sheet configured for covering the mat. Some of these embodiments further include a support structure configured for suspending the cover sheet above the mat. In some of these embodiments the support structure includes a plurality of stakes that support the cover sheet at spaced-apart support locations below the cover sheet. In some of these embodiments the cover sheet is perforated at locations that are spaced apart from the support locations of the stakes.

And any of the above embodiments can further include a water barrier configured for placement below the mat.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is an apparatus and method of reducing the temperature, dryness, and velocity of a hot dry winds that flow from a desert through a canyon onto a fire prone area, where said winds are referred to herein generically as "Santa Ana" winds. While not limited only to Southern California, the present invention is sometimes described herein with reference to the winds that flow from the Great Basin through canyons into the Los Angeles area. However, it will be understood that the present invention is applicable to any region where hot dry winds flow from a desert through canyons onto an area where it is desirable to reduce fire risks.

The present invention takes advantage of the concentration of flowing desert air that occurs as the air approaches a canyon through which it will flow as Santa Ana winds toward Los Angeles. This concentrating effect provides a relatively small region where mitigation can be implemented.

Figure 1:
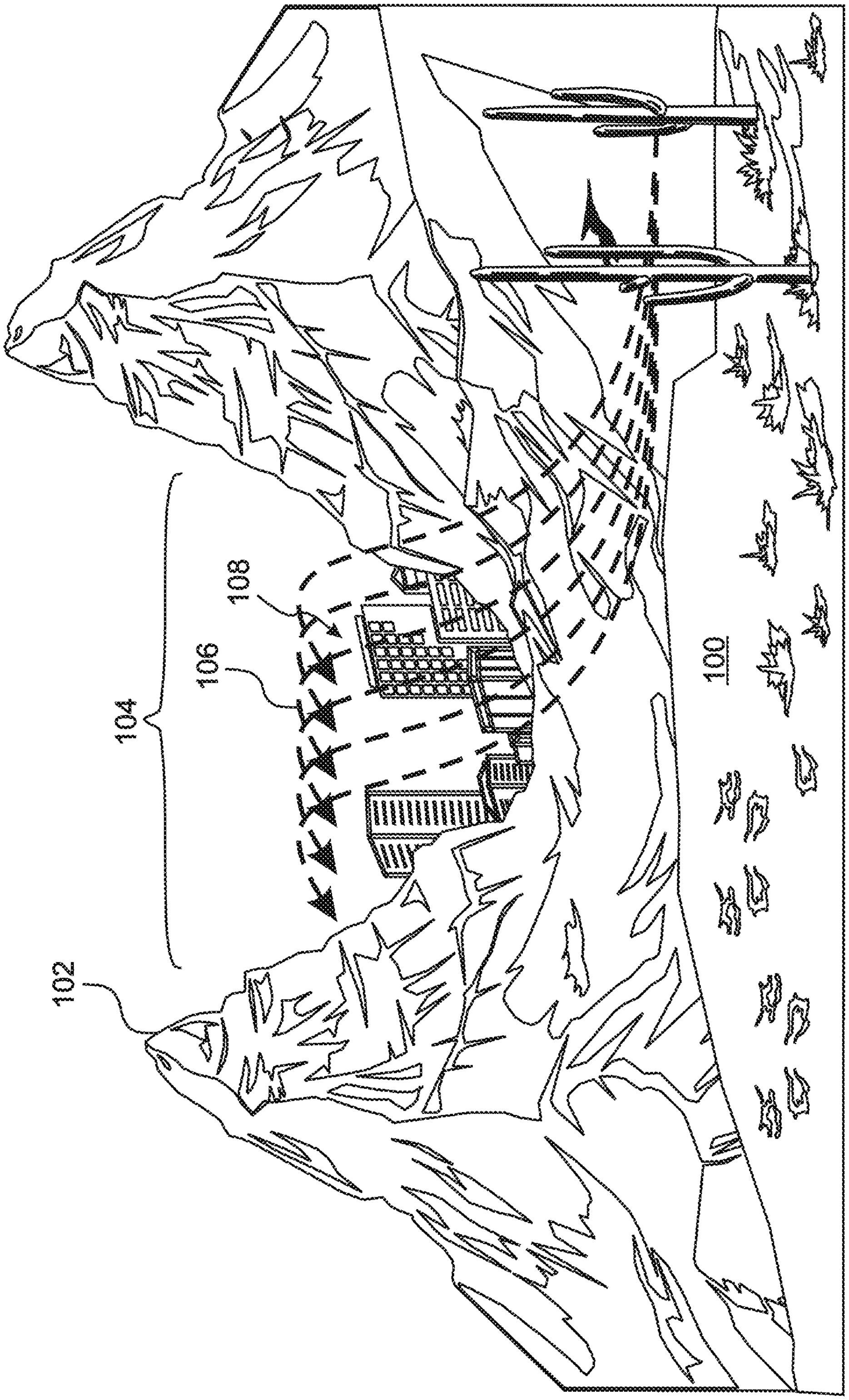
Fig. 1 (prior art)
FIG. 1 is a perspective view of wind flowing from a desert through a canyon onto a fire prone region, according to the prior art.
Figure 2:
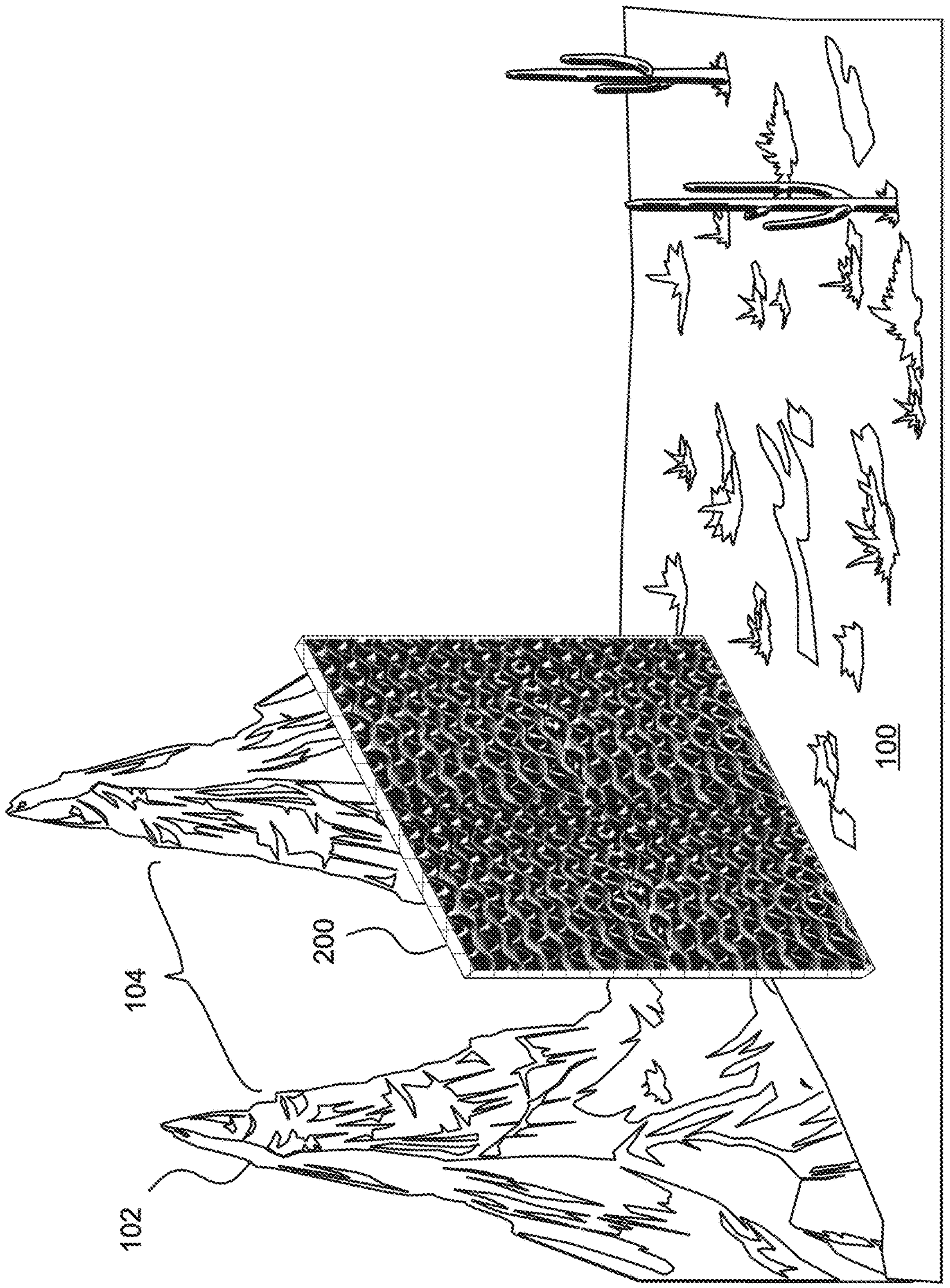
FIG. 2 is a perspective view of an evaporative barrier erected proximate an entrance to the canyon of FIG. 1, according to an embodiment of the present invention.

Specifically, with reference to FIG. 2, the invention comprises erecting a porous evaporative barrier 200 that is configured to intercept a significant fraction of the flowing air 106 as it enters the canyon 104. When Santa Ana wind conditions are present, water is applied continuously to the barrier 200. As the air 106 flows through the evaporative barrier 200, it is cooled and humidified by the resulting evaporation of water. In addition, the evaporative barrier 200 serves as a physical barrier that disrupts the air flow, and thereby slows its velocity.

Figure 3:
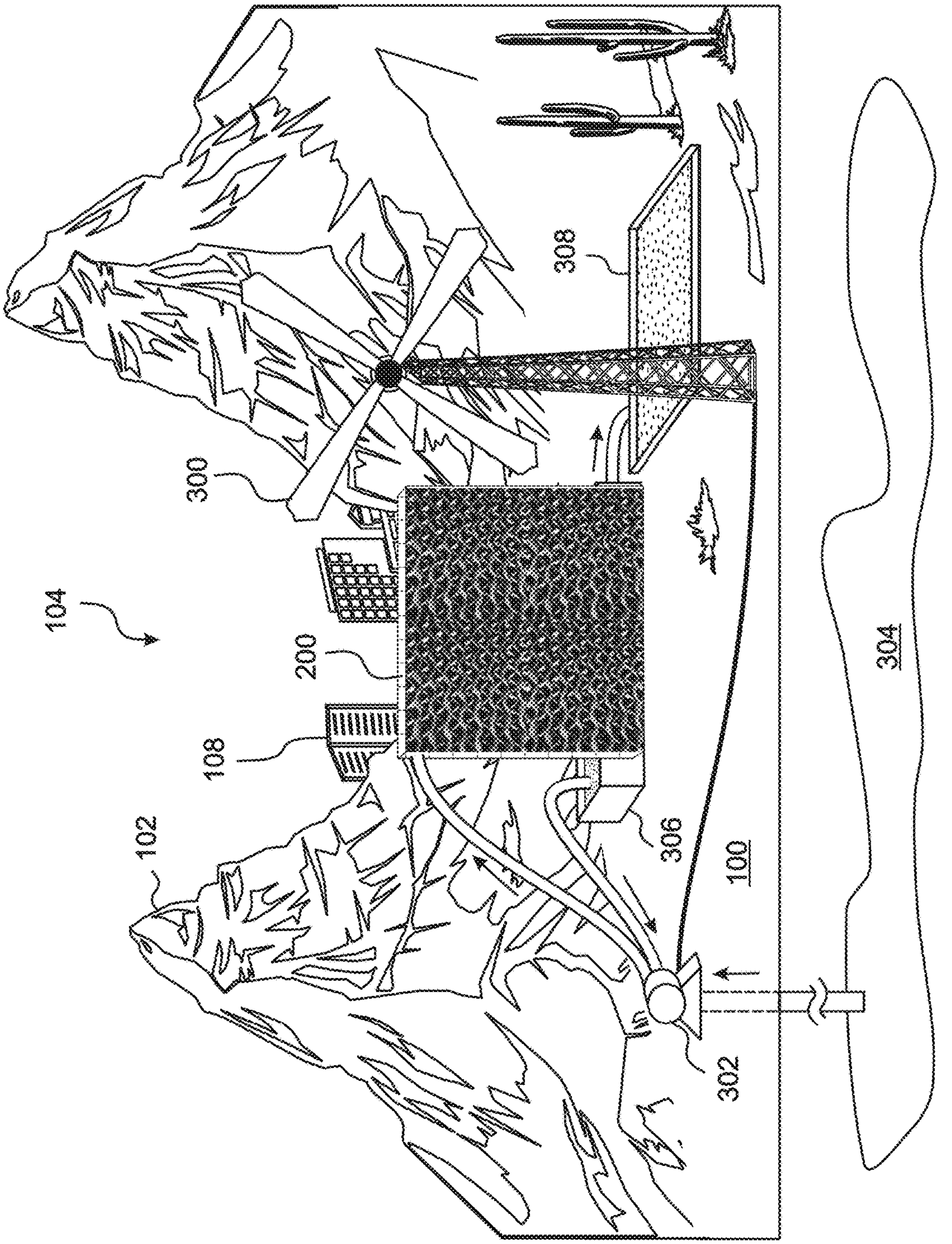
FIG. 3 is a perspective view of an embodiment of the present invention that comprises a windmill configured to provide electrical energy to a pump, said pump being configured to pump water from an underground aquifer onto the evaporative barrier.

With reference to FIG. 3, the water that is applied to the evaporative barrier 200 can be derived from any convenient source. In the case of the Great Basin, there are few sources of surface water that can be utilized. However, there is a significant aquifer 304 that underlies the desert 100, from which water can be drawn by a pump 302 for application to the evaporative barrier 200. The energy that is required to operate the pump(s) can be derived from any convenient energy source. In embodiments, solar panels (not shown) are used to provide the required energy, while in other embodiments one or more windmills 300 are erected near the entrance to the canyon 104, and hence in the direct path of the flowing air 106. Windmills 300 can be preferred, because, in addition to providing energy, they serve as an added physical barrier to the wind 106, and thereby further reduce the wind velocity, and also because their energy output is maximized precisely when it is most needed, which is when the Santa Ana winds 106 are blowing. Of course, electricity derived from a plurality of sources can be combined to meet the energy needs of the present invention.

In embodiments, a barrier reservoir 306 is provided proximate the bottom of the evaporative barrier 200, where water that has not been evaporated is collected, and from which the water is recirculated to the top of the evaporative barrier 200, thereby reducing the quantity of water that must be supplied from the underground aquifer 304 and/or from other sources.

While some fresh water can be found in aquifers near mountain fronts 102 in the Great Basin, much of the groundwater beneath the Great Basin is saline or brine, referred to herein as "brackish" water. In embodiments of the present invention where the water applied to the evaporative barrier 200 is brackish, the water becomes increasingly saline as it is repeatedly circulated between the barrier reservoir 306 and the top of the evaporative barrier 200. As a result, the water in the barrier reservoir 306 must be periodically expelled and replenished. In some of these embodiments, the water that is expelled from the barrier reservoir is collected in a drying tray 308, where it is fully evaporated, thereby providing a source of salt that can be harvested and used commercially.

Figure 4:
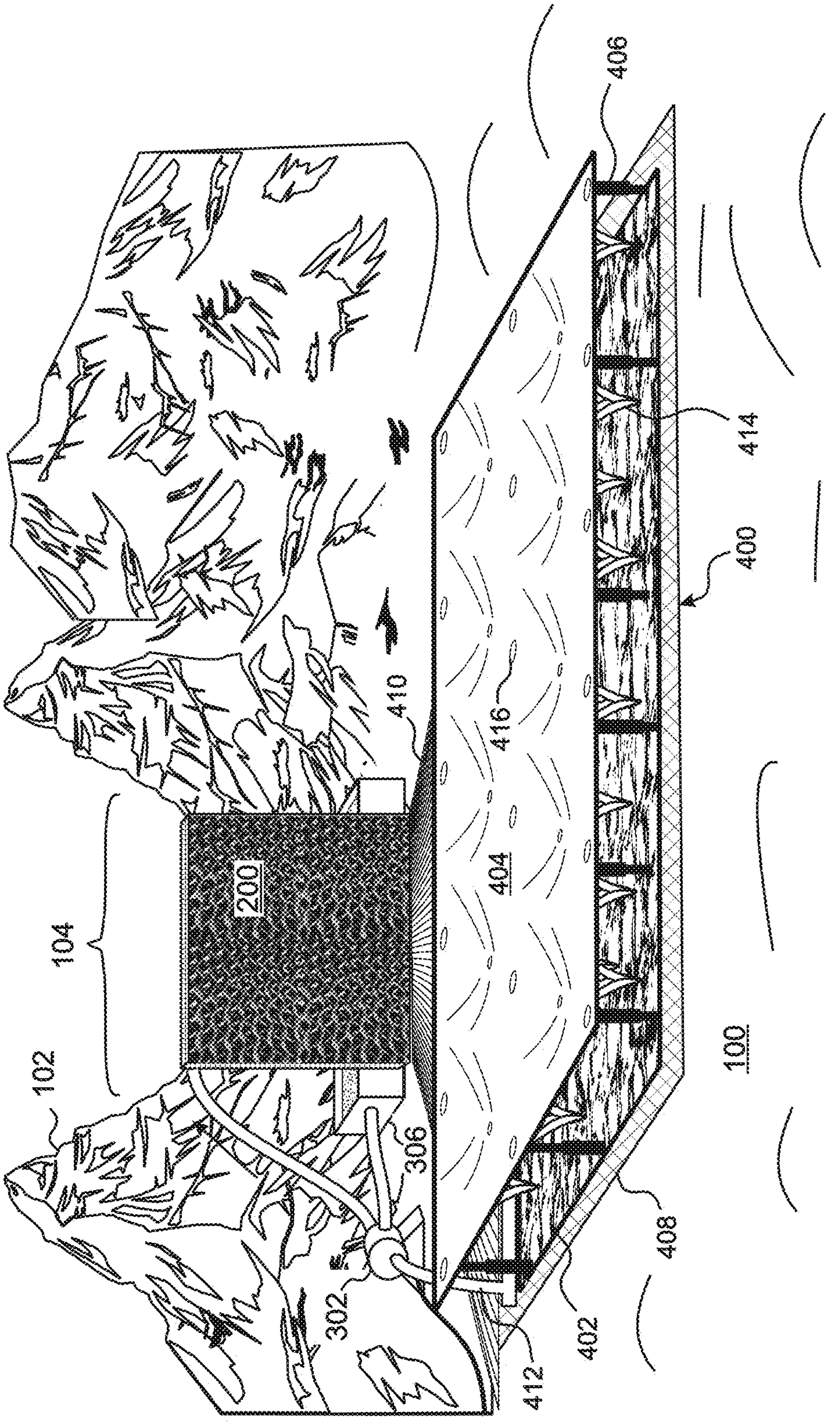
FIG. 4 is a perspective view of an embodiment of the present invention that further comprises a mat configured to enable vegetation to grow in the path of the wind.

In addition to the evaporative barrier 200 and associated apparatus, with reference to FIG. 4 the present invention further comprises a mat assembly 400 from which vegetation 414 is grown. The mat assembly 400 includes a mat 402, which can be a biodegradable coir mat, which is impregnated with seeds and/or seedlings, and with a "super absorbent polymer" or "SAP." In embodiments, the SAP is biodegradable, and in some of these embodiments the SAP is a cellulose-based or starch-based polymer. In some embodiments, fertilizer is included in the mat. And in various embodiments at least one of sand and soil is included in the mat.

The mat 402 is placed either at grade or slightly below grade, and sufficient fresh water is applied 412 to cause the SAP to become hydrated, thereby enabling the seeds and/or seedlings to sprout and/or take root in the mat 402. If the available water is brackish, then some of the water is directed to reverse osmosis apparatus, and/or other desalination apparatus (not shown), from which the resulting fresh water is directed to the mat 402.

In various embodiments, the mat 402 is covered by a perforated cover sheet 404 that is transparent or semi-transparent. The cover sheet 404 serves as a physical barrier to water vapor beneath the cover sheet 404 that results from evaporation of the applied water, so that the water vapor tends to condense on the under-side of the cover sheet 404, and to drip back onto the mat 402, where it is absorbed by the SAP. As a result, the water consumption of the mat 402 is minimized. Any rain that falls on the mat drips through the perforations 416 and onto the mat 402.

In some of these embodiments the cover sheet 404 is placed directly onto the mat 402, whereby the growing vegetation 414 lifts the cover sheet 404, and in embodiments eventually breaks through the cover sheet 404. In the illustrated embodiment, the cover sheet 404 is supported above the mat 402 by a support structure, which in the illustrated embodiment is a plurality of stakes 406, thereby protecting the vegetation 414 for a longer period of time before the vegetation 414 breaks through the cover sheet 404. The opacity of the cover sheet 404 can be increased by printing a pattern onto the cover sheet 404, adding a dye to the cover sheet material, or by any other means known in the art, so as to reduce the intensity of light reaching the mat 402 and vegetation 414, and thereby reduce solar heating.

Embodiments further include a water barrier 408 placed below the mat 402 which prevents any water that is not retained by the mat 402 and SAP from reaching the underlying soil or sand 100. The water barrier 408 can be a plastic sheet, and can be cellulosic or otherwise biodegradable.

In various embodiments, the mat 402 is cooperative with a "thermally conductive network" 410 that comprises at least one mesh, web, or other network of thermally conductive fibers 410, such as a mesh of copper wire or a network of high crystallinity polyethylene nanofibers. The thermally conductive network 410 extends from the mat 402 to the evaporative barrier 200, so that the mat 402 is cooled by the evaporative barrier 200, which results in cooling of the vegetation 414 as it germinates and grows from the mat 402.

Figure 5:
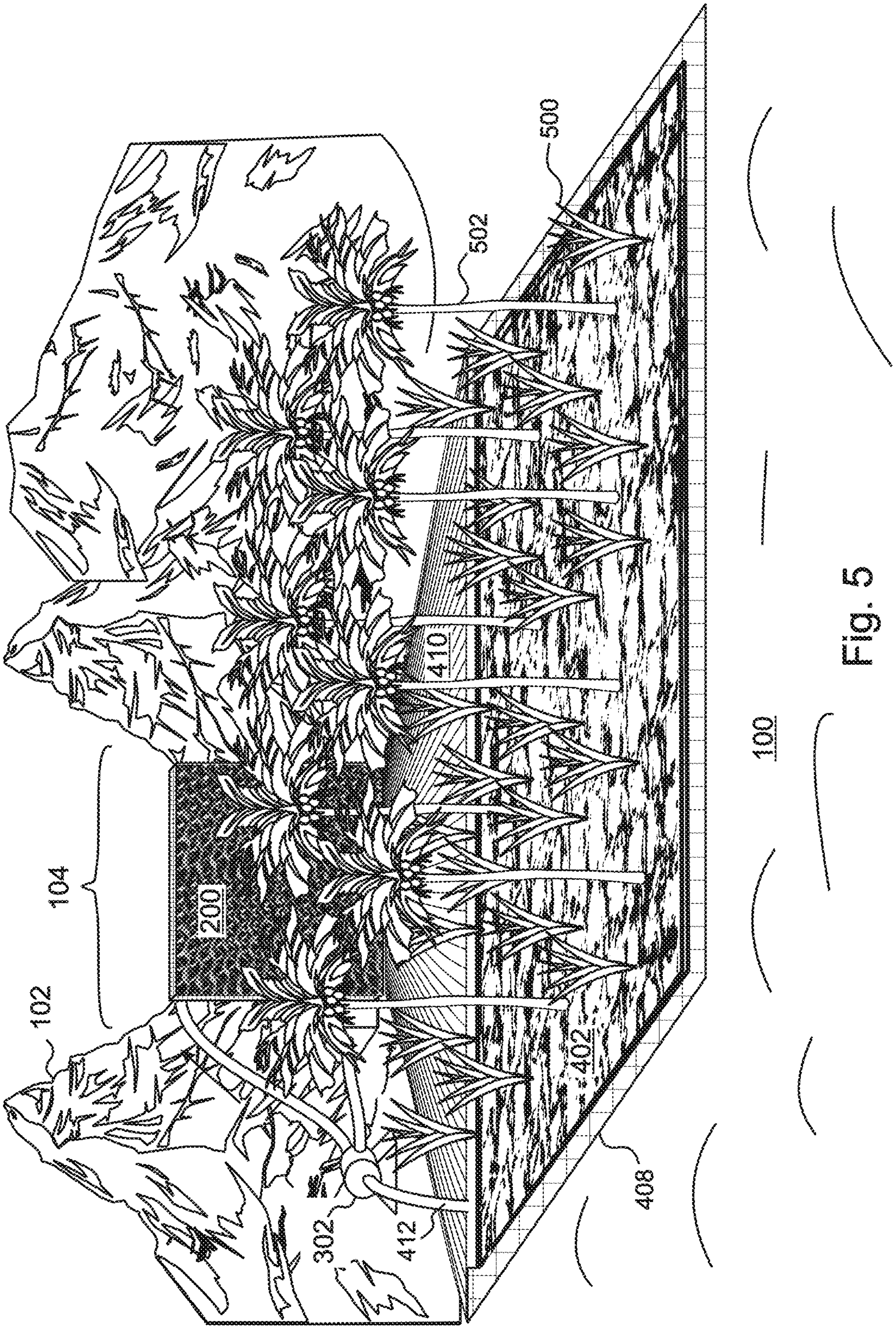
FIG. 5 is a perspective view of the embodiment of FIG. 4 after the vegetation has grown and matured, said vegetation comprising large bushes and trees.

With reference to FIG. 5, the mat assembly 400 is located in the path of the flowing winds 106, where the resulting vegetation 500, 502 releases additional water vapor into the atmosphere due to transpiration, thereby providing an additional source of humidity. In embodiments, the vegetation 500, 502 also serves as an additional physical barrier that further slows the velocity of the winds 106.

serves as an additional source of humidity, and in embodiments also as an additional physical barrier that further slows the velocity of the winds. In some embodiments, the vegetation 500, 502 that grows from the mat assembly 400 includes large, sturdy bushes 500 and/or trees 502, which provide an added physical barrier to the flow of air 406 toward the canyon 404, in addition to the evaporative barrier 200 and, in embodiments, to the one or more windmills 300.

Figure 6:
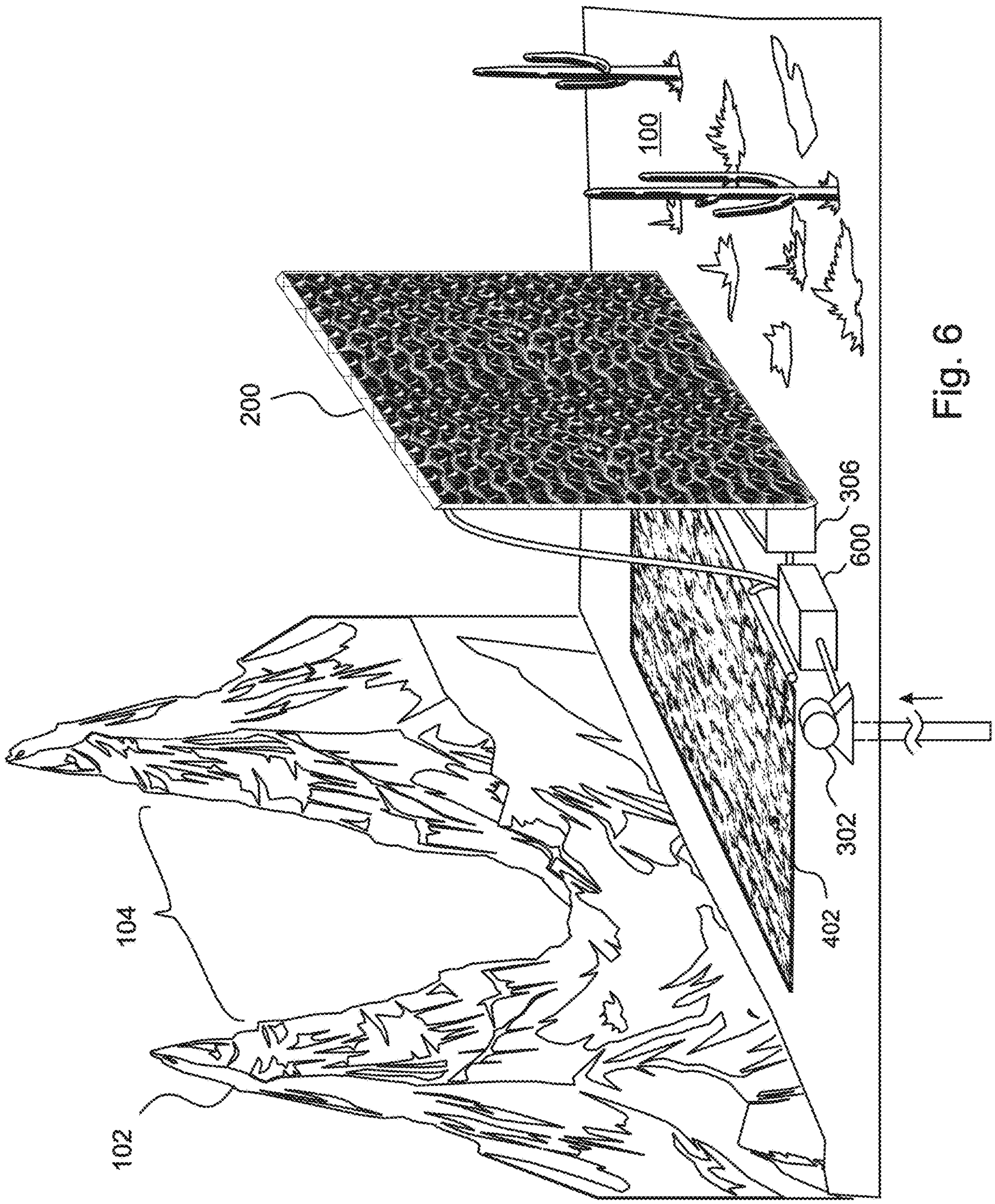
FIG. 6 is a perspective side view of an embodiment in which the mat is downwind of the evaporative barrier.

In FIGS. 4 and 5, the mat assembly 400 is upwind of the evaporative barrier 200, which allows the evaporative barrier 200 to be placed as close to the canyon entrance as possible. However, this arrangement allows the hot, dry desert wind to impinge on the vegetation 414 without mitigation, except for some velocity reduction if windmills 300 are placed upwind of the mat assembly 400. With reference to FIG. 6, in other embodiments, the mat 402 is located between the evaporative barrier 200 and the entrance to the canyon 104, i.e. downwind of the evaporative barrier 200, such that the vegetation 500, 502 that grows from the mat 402 benefits from the added humidity and reduced wind velocity provided by the evaporative barrier 200. The embodiment of FIG. 6 further includes a desalination apparatus 600 that removes salt from brackish water received by the pump 302 and directs the resulting fresh water to the mat 402, barrier reservoir 306, and evaporative barrier 200.

Note that power sources such as windmill(s) 300 have been omitted from FIGS. 4-6 to improve the visibility of the other elements that are shown. In embodiments, windmills 300 would be present upwind of the evaporative barrier 200.

In embodiments where there is water flowing through some portion of the canyon or other terrain through which the Santa Ana winds 106 flow from the desert to the fire prone region, such that the Santa Ana winds 106 tend to pass over the flowing water, the efficacy of the present invention can be further enhanced by blocking the flowing water and creating a wetland or a reservoir, thereby spreading water that was previously confined in one or more narrow stream beds across a very large surface area. As the Santa Ana winds 106 flow across the wetland or reservoir, water vapor will be added to the flowing air 106, thereby further humidifying and cooling the winds 106.

In some embodiments where sufficient vegetation is present near the flowing water, such a wetland or reservoir can be created economically, and in an ecologically friendly manner, by introducing beavers into the area, so that the beavers will naturally create dams that block the flow of the water to create a wetland or reservoir. This approach was applied in 1948 by the Idaho Fish and Game Department, which relocated 76 beavers from a populated area into a wilderness area. Since the wilderness area was difficult to access, the beavers were dropped from the air using surplus World War II parachutes in spring-loaded boxes that opened upon landing.

According to an article dated Dec. 8, 2024 by Forest Service Employees for Environmental Ethics (FSEEE), "In the decades following the release of Idaho's skydiving beavers, the benefits of beaver activity caught the attention of NASA analysts, whose satellite imagery revealed lush landscapes in areas where the beavers had landed. As it turns out, the beavers created, and are sustaining, ecosystems that represent a front-line defense against wildfire and drought."

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A method of mitigating fire hazards arising from a wind flowing from a desert through a canyon onto a fire prone region, the method comprising:

providing or identifying a source of water proximate an entrance to the canyon;

providing a source of electrical energy proximate the entrance to the canyon;

providing an evaporative cooling system, said evaporative cooling system comprising an evaporative barrier erected proximate the entrance to the canyon, the evaporative barrier being configured to expose the wind to water disbursed within the evaporative barrier, thereby cooling and humidifying the wind, and slowing a velocity of the wind;

providing a pump cooperative with the source of electrical energy, the source of water, and the evaporative barrier, the pump being configured to direct water from the source of water onto the evaporative barrier; and causing the pump to apply water from the source of water to the evaporative barrier, thereby providing and maintaining the water disbursed within the evaporative barrier.

2. The method of claim 1, wherein the evaporative cooling system further comprises a barrier reservoir configured to collect water that drains from the evaporative barrier.

3. The method of claim 2, wherein the pump is configured to recycle the collected water from the barrier reservoir to the evaporative barrier.

4. The method of claim 3, wherein the water that is applied to the evaporative barrier is brackish, and wherein the method further comprises directing brackish water that is removed from the barrier reservoir to a drying tray, and allowing the brackish water in the drying tray to fully dry, thereby providing a residue of salt.

5. The method of claim 1, wherein the source of water comprises a well configured to draw water from an underlying aquifer.

6. The method of claim 1, wherein the source of electrical energy comprises a solar energy system.

7. The method of claim 1, wherein the source of electrical energy comprises at least one windmill configured to convert energy derived from the wind into electrical energy.

8. The method of claim 1, further comprising:

providing a mat having incorporated therein seeds and/or seedlings and a super-absorbent polymer;

locating the mat at or below grade; and applying fresh water to the mat, thereby causing vegetation to germinate and grow from the mat, so that the wind flows through the vegetation, whereupon the vegetation adds humidity to the wind and reduces the velocity of the wind.

9. The method of claim 8, wherein the vegetation includes a plurality of trees.

10. The method of claim 8, wherein the water applied to the evaporative barrier is brackish, and wherein applying fresh water to the mat comprises directing water from the source of water to a desalination apparatus, and therefrom to the mat.

11. The method of claim 8, wherein locating the mat comprises locating the mat downwind of the evaporative barrier.

* * * * *